Patented Dec. 10, 1935

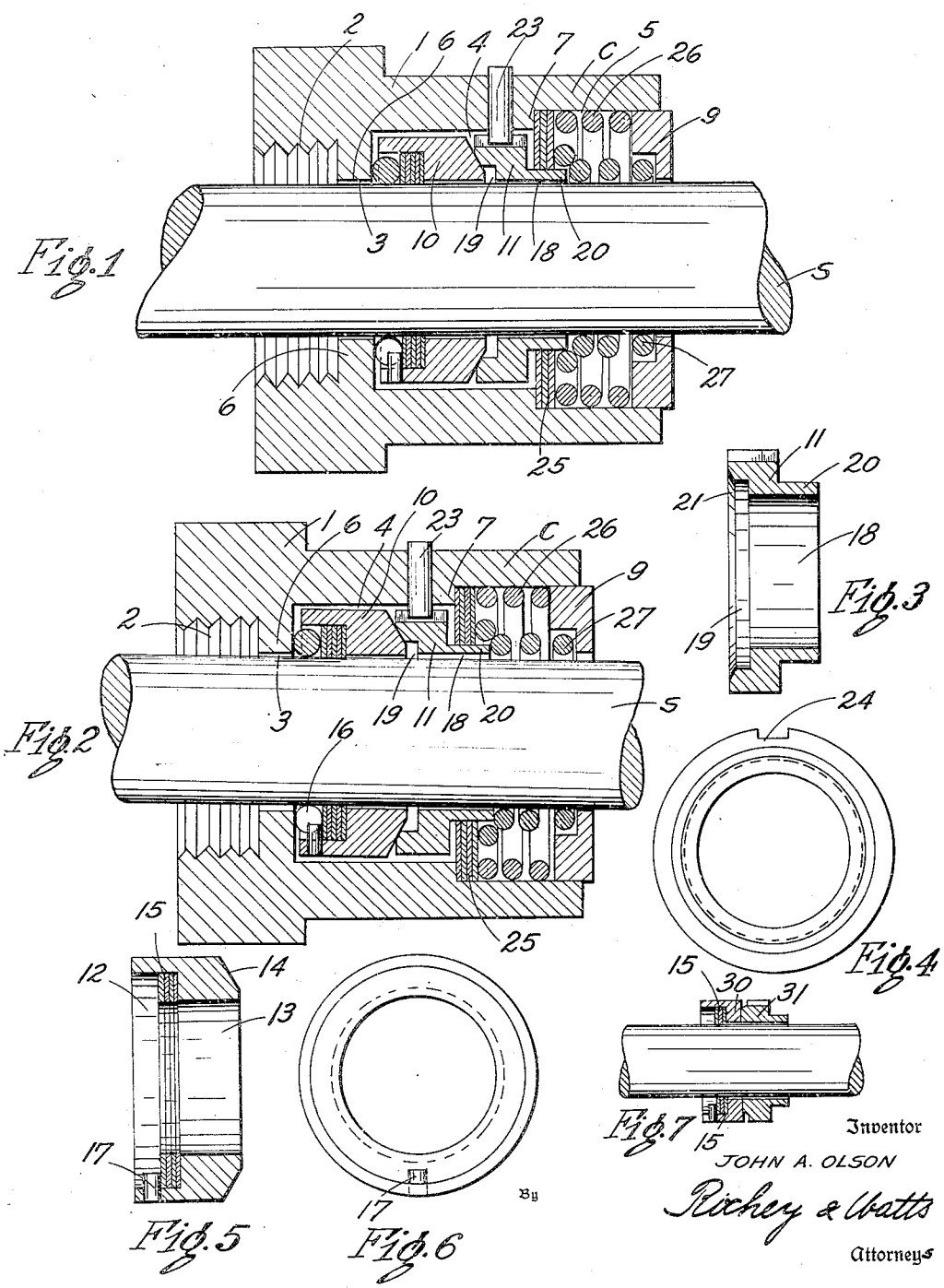

2,023,898

UNITED STATES PATENT OFFICE 2,023,898

SHAFT SEAL

John A. Olson, Cleveland, Ohio

Application June 25, 1932, Serial No. 619,191

8 Claims. (Cl. 286—7)

This invention relates to a shaft seal. It has to do, more particularly, with a seal for a rotary shaft of the type that operates for a portion of its length in fluid. The seal is intended to prevent the escape of fluid between the shaft and its bearings or the fixed part in which it rotates.

Generally speaking, it has been more or less a difficult problem to preclude the escape of fluid around the bearings of a rotating shaft. This is particularly true where there is some clearance between the bearing and the shaft which may be necessary to prevent binding of the shaft and to allow it free rotation, or on the other hand may be the result of poor or inaccurate machining operations. Where this condition occurs, the shaft is afforded a slight radial or lateral movement, allowing the shaft to become "cocked" or tilted in its bearings, that ordinarily would destroy the efficiency of a sealing joint and would result in leakage.

This invention contemplates the provision of a sealing joint for a revolvable shaft that consists in two shaft encompassing members, one of which is sealed with respect to the shaft and is driven therewith, the other of which is sealed with respect to the housing and is non-rotatable. By virtue of an oscillatable mounting for each of the sealing members, their co-acting sealing surfaces, which are beveled, may automatically adjust themselves to maintain their respective sealing surfaces in contact. This feature makes for a tight leakproof joint and automatically compensates for any "cocking" of the shaft.

One object of my invention is to produce a seal for a rotary shaft that will effectively preclude the leakage of fluid past the joint even in the event that the shaft is "cocked" or tilted during operation. Another object of this invention is to produce a shaft seal that is economical to manufacture and assemble and will operate efficiently for the purpose intended.

Other objects and advantageous features of this invention are to be noted in the following detailed description and accompanying drawing, wherein like characters of reference designate corresponding parts and wherein:—

Figure 1 is a vertical longitudinal section of my shaft seal mounted in co-operative relation with the parts with which it is employed;

Fig. 2 is a detail in section of the main sealing members assembled on the shaft;

Fig. 3 is a vertical longitudinal section of one of the sealing members;

Fig. 4 is an end view of the sealing member shown in Fig. 3;

Fig. 5 is a vertical longitudinal section of the other sealing member;

Fig. 6 is an end view of the member shown in Fig. 5;

Fig. 7 is a showing of a modified form of sealing device.

With reference to the drawing, the preferred form of my shaft seal has been shown in Fig. 1 in conjunction with a shaft S and a casing C through which the shaft extends. The casing shown is chiefly for the purpose of illustration and explanation in reciting the nature and mode of operation of my sealing means and may be replaced by casings of other design to fit the need of various installations without departing from the spirit and scope of this invention. Conveniently, the shaft S may be the water pump impeller shaft for an internal combustion engine, one end of the shaft being driven through a flexible pulley from the cam shaft, and the opposing end mounting an impeller by virtue of which circulation of water is afforded.

The casing C may consist of a body portion 1 having a longitudinal passage that is bored to several diameters as indicated by the numerals 2, 3, 4 and 5. The zone of the passage indicated by the numeral 2 may be threaded interiorly for joinder with a male part on the block co-axial with the bore therein, through which the shaft extends. The numeral 3 indicates an intermediate bore in a radial wall 6, the wall acting as one of the bearings for the shaft S. The numeral 4 indicates that portion of the passage that houses the major portion of the sealing device, whereas the zone 5 which is the largest in diameter houses the resilient members that urge the sealing means to be hereinafter described into co-operative engagement and also affords a shoulder 7 at the bottom of the bore, which acts as a seat for a plurality of sealing members also to be hereinafter referred to. This end of the passage is closed by an apertured end member 9 that is pressed into the housing and acts as the other bearing for the shaft S.

To aid in illustrating the manner in which the shaft seal operates, when the shaft is "cocked" or tilted, I have shown a clearance between the shaft and the radial wall 3, and end member 9, respectively. This clearance may arise from improper machining, or may be intentional to allow the free rotation of the shaft without binding. In any event, during the operation of the shaft, it is liable to become "cocked" with respect to the axis of the bores in the radial wall 3 and the member 9, in the manner shown in Fig. 2, which would ordinarily result in the inefficient operation of certain types of sealing means not adjustable to compensate for such displacement.

My novel sealing device 1 is intended to effectively preclude leakage between a shaft that may become so "cocked," and its casing, and preferably consists in two co-operating shaft encompassing members 10 and 11, one of which is sealed against leakage with respect to the shaft and is rotatable therewith, the other of which is sealed against leakage with respect to the casing and is literally "hung" therefrom, both of which have co-operating sealing surfaces adapted to prevent leakage of fluid between the shaft and the casing.

Specifically, the member 10 consists in a cup shaped fitting which may be machined from bar stock and has a bore of two diameters divided into the zone 12 and the zone 13 and further is machined to provide a conical, preferably case hardened, face 14 that co-operates with a reversely contoured surface on the member 11 to effect a seal between the two members as will be hereinafter referred to more in detail. In the zone 12, the cup shaped member is intended to receive a packing material 15 such as asbestos or the like. This packing material is intended to prevent fluid leakage between the cup and the shaft S. In the zone 13 of the passage, the diameter of the bore is such that a slight clearance is afforded between the member and the shaft so that the cup may oscillate in any direction (for a purpose to be referred to later) about the axis of the shaft, to a degree determinable by the extent of clearance. The cup shaped member is preferably driven with the shaft and to this end, a split ring 16, better shown in Fig. 6, is placed in the bore 12 behind the sealing material with the split portion engaging a radial pin 17 pressed in the periphery of the cup. Thus, the rotation of the shaft is transmitted through the ring 16 and the pin 17 to the cup. The ring 16 also prevents longitudinal displacement of the packing and is normally intended to abut against the radial wall 3 when the sealing device is assembled on the shaft S.

The second member of my novel sealing means, indicated by the numeral 11, preferably consists in a fitting that may be formed from bar stock and is machined to provide a longitudinal passage 18, counterbored at 19, and turned to provide a shaft encompassing sleeve 20. The bore 18 is preferably greater in diameter than the diameter of the shaft to provide clearance that will permit the shaft to tilt axially therein to a degree determined by the degree of clearance. The member 11 is also chamfered, as at 21, at the upper side of the wall of the bore 19 to provide a surface for co-operation with the surface 14 of the member 10.

When the member 11 is assembled on the shaft, it is moved forward into abutting relation with the member 10 and is held in position by a pin 23 that extends through the casing C and is located in a wide slot 24 in the outer periphery of the member 11. Moreover, the member 11 is suspended or hung from the casing C by virtue of a plurality of apertured sealing devices 25 closely encompassing the sleeve 20 and in leakproof relation with the casing C. The sealing devices, as will be noted, seat against the shoulder 7 and are pressed into engagement therewith by a coil spring 26 that abuts at one end against the end member 9. In addition, the member 11 is also urged axially into engagement with the cup shaped member by virtue of the coil spring 27 that abuts against the end member 9 and closely encompasses the shaft. These sealing members are of sufficient flexibility to afford forward and backward movement of the member 11 and of sufficient resiliency as to permit expansion or contraction under lateral stress. Hence, the member 11 is capable of limited oscillation to adjust itself to the face 14 of the member 10.

It is to be observed that the cup shaped member 10 is sealed with respect to the shaft and is so mounted on the shaft that it is co-axial therewith, however, the sealing member 11 is suspended from the casing C and is co-axial with the bores in the casing C, but is not necessarily co-axial with the axis of the shaft. The sealing surfaces 14 and 21, respectively, of course afford a seal between the two members 10 and 11.

It is also to be observed that the cup shaped member 10 moves with the shaft which in most assemblies is permitted a certain amount of end play. The sealing member 11, however, follows the member 10 as it moves to the left with the shaft (assuming that the end play is such that the shaft is moving in this direction) under the resilient force of the spring 27 to maintain the sealing surfaces in co-operative relation. If, the shaft should move to the right, the cup shaped member 10 forces the member 11 to the right against the resilient pressure of the spring 27, thereby insuring that the sealing surfaces will be maintained in contact.

In the operation of this novel shaft seal, assuming that the shaft is operating normally, that is—not "cocked" or tilted, it is to be observed, in Fig. 1, that the members 10 and 11 are substantially co-axial and that the sealing surfaces 21 and 14 of the two members are in leak proof engagement. Assuming that the left end of the shaft is operating in a fluid, it follows that the fluid may flow axially along the shaft through the passage 3 and enter the zone 4. However, the sealing material 15 stops any flow along the shaft beyond this zone, although the zone 4 may be completely filled with fluid. Fluid is stopped from escaping from this zone by virtue of the sealing members 25 that are firmly pressed into engagement with the shoulder 7 and by the co-operating sealing surfaces 21 and 14 of the two sealing discs. Hence, no fluid can escape into the zone 5 and leakage of fluid is effectively prevented. It is also to be observed that the rotation of the member 10 will also tend to throw liquid toward the casing and away from the sealing surfaces 14 and 21.

Assuming, however, that at some time during the operation of the shaft it becomes "cocked" or tilted with respect to the axis of the bores in the radial part 3 and end member 9, as illustrated in Fig. 2, the member 10 may oscillate slightly with respect to shaft S, while the member 11 may oscillate with respect to the housing so that the two members may automatically align themselves to maintain proper sealing contact between the respective sealing surfaces. It is to be observed that the sealing members 15 or 25 may oscillate to allow the members to adjust themselves properly.

In Fig. 7 of the drawing, I have shown a slightly modified form of sealing device including the members 30 and 31, wherein the sealing surfaces are square ground and contact in a plane normal to the axis of the shaft. In other respects, the two members are identical with those of the preferred showing, clearance being provided between each and the shaft, and the member 30 being sealed with respect to the shaft by the sealing members 15, the member 31 being "hung" from the casing by the sealing members 25. The operation is substantially the same in this showing as in the preferred showing and oscillation of the sealing members 30 and 31 to permit the adjustment of one of the sealing faces to the plane of the other sealing face is afforded in this instance as in the preferred form through the flexibility of the sealing devices 15 and 25.

Having thus described my invention, I am aware that numerous and various departures may be made therefrom. However, I do not care to be limited to the exact disclosure shown except by the claims appended hereto.

What I claim is:—

1. In combination with a rotatable shaft and a housing which the shaft penetrates, said housing having spaced parts forming bearings for said shaft, a sealing device for preventing the escape of fluid past at least one of the bearings, said device comprising a cup shaped member oscillatably mounted on said shaft and being sealed with respect thereto, a second member encompassing said shaft and being oscillatably mounted in said housing, said two members having surfaces adapted to cooperate to produce a seal, and means for mounting said second named member in said housing which comprises an axially deformable flexible disk having a portion engaging the housing and resilient means engaging said disk for urging said portion into sealing relation therewith.

2. In combination with a rotatable shaft and a housing through which the shaft extends, said housing having an internal shoulder, a sealing means comprising a member surrounding the shaft and rotatable therewith, a second member having a flange surrounding the shaft and having a sealing surface adapted to cooperate with the first member, and means for supporting said second member from the housing comprising a flexible annular sealing disk having an inner portion adapted to engage said flange and an outer portion adapted to engage said shoulder in the housing, spring means for urging said sealing disk against said shoulder, and spring means for urging said second member into engagement with said first member, said sealing means being axially deformable whereby said second member is supported for longitudinal or oscillatory movement.

3. In combination with a rotatable shaft and a housing through which the shaft extends, said housing having parts forming bearings for said shaft, a sealing device for preventing the escape of fluid past at least one of said bearings comprising a cup-shaped member mounted on the shaft and being sealed with respect thereto, a resilient ring disposed within the cup-shaped member and in driving engagement with said member and with the shaft, a second member encompassing the shaft, said two members having surfaces adapted to cooperate to produce a seal, and means for supporting said second member in said housing comprising a flexible disc having a portion engaging the housing, and resilient means engaging said disc and urging said portion into sealing engagement with the housing.

4. In combination with a rotatable shaft and a housing through which the shaft extends, said housing having parts forming bearings for said shaft, a sealing device for preventing the escape of fluid past at least one of the bearings comprising two members encompassing the shaft and having cooperating sealing surfaces, means for driving one of said members with the shaft comprising a split resilient ring in driving engagement with the shaft, and a pin engaging the member and the ends of the resilient ring, and means for supporting the other member from the housing comprising a flexible disc having a portion engaging the housing, and resilient means engaging said disc for urging said portion into sealing relation with the housing.

5. In combination with a rotatable shaft and a housing through which the shaft extends, a sealing device for preventing the escape of fluid from said housing and around said shaft comprising two members encompassing the shaft and having cooperating sealing surfaces, means for driving one of said members with the shaft while allowing oscillation of the member with respect to the shaft comprising a split resilient ring in driving engagement with the shaft, and a pin engaging the member and the ends of the resilient ring, and means for creating a seal between the other member and the housing.

6. In combination with a rotatable shaft and a housing through which the shaft extends, a sealing device for preventing the escape of fluid from said housing and around said shaft comprising two members encompassing the shaft and having cooperating sealing surfaces, means for driving one of said members with the shaft while allowing oscillation of the member with respect to the shaft comprising a split resilient ring in driving engagement with the shaft and means carried by the member and disposed between the ends of the ring for driving the member with the ring, and means for creating a seal between the other member and the housing.

7. In combination with a rotatable shaft and a housing through which the shaft extends, a sealing device for preventing the escape of fluid from said housing and around the shaft comprising a cup-shaped member loosely mounted on the shaft and being sealed with respect thereto, a split resilient metallic ring disposed within the cup-shaped member and in driving engagement with the shaft, means mounted on the cup-shaped member and engaging the ends of said ring whereby the cup-shaped member is driven with the shaft, a second member encompassing the shaft, said two members having surfaces adapted to cooperate to produce a seal, and means for creating a seal between said second member and said housing.

8. In combination with a rotatable shaft and a housing through which the shaft extends, a sealing device for preventing the escape of fluid between said shaft and said housing comprising a sleeve member surrounding the shaft and sealed with respect to the housing, a cup-shaped member loosely surrounding the shaft and engaging said sleeve member, said cup-shaped member and said sleeve member having cooperating sealing surfaces, means disposed within said cup-shaped member for sealing said cup-shaped member with respect to the shaft while allowing oscillation of said cup-shaped member with respect to the shaft, and means for driving said cup-shaped member comprising a split resilient ring in driving engagement with the shaft, and means in driving engagement with said cup-shaped member and having a portion disposed between the ends of said resilient ring for driving said cup-shaped member with the ring.

JOHN A. OLSON.